(12) United States Patent
Fukatsu et al.

(10) Patent No.: US 10,746,711 B2
(45) Date of Patent: Aug. 18, 2020

(54) METHOD OF MEASURING QUANTITY OF MOISTURE IN ELECTRODE, METHOD OF MANUFACTURING ELECTRODE FOR LITHIUM-ION SECONDARY BATTERY, MOISTURE QUANTITY MEASURING APPARATUS, AND METHOD OF MEASURING MOISTURE QUANTITY

(71) Applicant: NEC ENERGY DEVICES, LTD., Sagamihara-shi, Kanagawa (JP)

(72) Inventors: Kimiyoshi Fukatsu, Kanagawa (JP); Tomohiko Hayashi, Kanagawa (JP)

(73) Assignee: Envision AESC Energy Devices Ltd., Sagamihara-shi, Kanagawa (JP)

( * ) Notice: Subject to any disclaimer, the term of this patent is extended or adjusted under 35 U.S.C. 154(b) by 422 days.

(21) Appl. No.: 15/735,397

(22) PCT Filed: Jun. 1, 2016

(86) PCT No.: PCT/JP2016/066131
§ 371 (c)(1),
(2) Date: Dec. 11, 2017

(87) PCT Pub. No.: WO2016/199631
PCT Pub. Date: Dec. 15, 2016

(65) Prior Publication Data
US 2018/0136177 A1    May 17, 2018

(30) Foreign Application Priority Data

Jun. 12, 2015 (JP) .................................. 2015-119205
Jun. 12, 2015 (JP) .................................. 2015-119206

(51) Int. Cl.
*G01N 1/22* (2006.01)
*G01N 25/56* (2006.01)
(Continued)

(52) U.S. Cl.
CPC ............. *G01N 31/168* (2013.01); *G01N 1/22* (2013.01); *G01N 1/2226* (2013.01); *G01N 25/56* (2013.01);
(Continued)

(58) Field of Classification Search
CPC ...... G01N 1/22; G01N 31/168; G01N 1/2226; G01N 25/56; H01M 4/139
See application file for complete search history.

(56) References Cited

U.S. PATENT DOCUMENTS

2004/0047762 A1* 3/2004 Masaoka .................... A61L 2/14
422/22
2016/0349201 A1* 12/2016 Graunke .............. G01N 27/123

FOREIGN PATENT DOCUMENTS

JP        63-135144 U1    9/1988
JP        07-043268 A     2/1995
(Continued)

OTHER PUBLICATIONS

International Search Report for PCT/JP2016/066131 dated Aug. 23, 2016 [PCT/ISA/210].
(Continued)

*Primary Examiner* — Jamel E Williams
(74) *Attorney, Agent, or Firm* — Sughrue Mion, PLLC

(57) ABSTRACT

A method of measuring a quantity of moisture in an electrode includes at least three steps as follows: disposing an electrode, which is a measurement target sample, inside a container provided with a gas introduction pipe and a gas discharge pipe; heating the electrode by supplying inert gas heated to a predetermined temperature in advance to the inside of the container through the gas introduction pipe, and vaporizing moisture adsorbed to the electrode; and collecting the moisture vaporized from the electrode, together with the inert gas through the gas discharge pipe and determining
(Continued)

the quantity of the collected moisture. In addition, a moisture quantity measuring apparatus includes a container that has a gas introduction pipe and a gas discharge pipe, a heating unit, and a moisture quantity measuring unit that collects moisture vaporized from a sample, through the gas discharge pipe and determines the quantity of collected moisture.

20 Claims, 3 Drawing Sheets

(51) Int. Cl.
| | | |
|---|---|---|
| *G01N 31/16* | (2006.01) | |
| *H01M 4/139* | (2010.01) | |
| *G01N 27/416* | (2006.01) | |
| *H01M 4/1391* | (2010.01) | |
| *H01M 4/525* | (2010.01) | |
| *H01M 10/0525* | (2010.01) | |
| *H01M 10/058* | (2010.01) | |
| *H01M 10/052* | (2010.01) | |
| *H01M 4/02* | (2006.01) | |

(52) U.S. Cl.
CPC ........ *G01N 27/4161* (2013.01); *H01M 4/139* (2013.01); *H01M 4/1391* (2013.01); *H01M 4/525* (2013.01); *H01M 10/0525* (2013.01); *G01N 2001/2241* (2013.01); *H01M 10/052* (2013.01); *H01M 10/058* (2013.01); *H01M 2004/021* (2013.01)

(56) References Cited

FOREIGN PATENT DOCUMENTS

| JP | 07-043371 A | 2/1995 |
|---|---|---|
| JP | 10-334919 A | 12/1998 |
| JP | 2005-140591 A | 6/2005 |
| JP | 2009-156625 A | 7/2009 |
| JP | 2016118425 A * | 6/2016 |

OTHER PUBLICATIONS

Written Opinion for PCT/JP2016/066131 dated Aug. 23, 2016 [PCT/ISA/237].

* cited by examiner

METHOD OF MEASURING QUANTITY OF MOISTURE IN ELECTRODE, METHOD OF MANUFACTURING ELECTRODE FOR LITHIUM-ION SECONDARY BATTERY, MOISTURE QUANTITY MEASURING APPARATUS, AND METHOD OF MEASURING MOISTURE QUANTITY

CROSS REFERENCE TO RELATED APPLICATIONS

This application is a National Stage of International Application No. PCT/JP2016/066131 filed Jun. 1, 2016, claiming priority based on Japanese Patent Application Nos. 2015-119205 filed Jun. 12, 2015 and 2015-119206 filed Jun. 12, 2015, the contents of all of which are incorporated herein by reference in their entirety.

TECHNICAL FIELD

The present invention relates to a method of measuring a quantity of moisture in an electrode, a method of manufacturing an electrode for a lithium-ion secondary battery, a moisture quantity measuring apparatus, and a method of measuring a moisture quantity.

BACKGROUND ART

For their large capacity per unit volume and unit mass, lithium-ion secondary batteries are widely used for laptops and electronic terminals such as mobile phones. Recently, lithium-ion secondary batteries are also applied in electric vehicles which can travel by only a battery, hybrid vehicles which use both a battery and an engine, electric motorcycles, and the like. Moreover, in accordance with the spread of renewable energy and rising awareness of the environment, lithium-ion secondary batteries are also used for stationary batteries, and development in lithium-ion secondary batteries for a large-capacity power storage system and the like become active as well.

Since lithium-ion secondary batteries are used in a potential range in which water cannot exist stably, an electrolytic solution having a non-aqueous organic matter as a main body is used. If moisture is included in a member configuring a lithium-ion secondary battery, the moisture is decomposed at the time of the first charging, and there are cases where hydrogen and oxygen are generated. In such a case, due to the generated hydrogen and oxygen, each of members configuring the lithium-ion secondary battery deteriorates, and the characteristics of the lithium-ion secondary battery are degraded.

Therefore, in a step of manufacturing a lithium-ion secondary battery, main members are sufficiently dried such that no moisture is adsorbed thereto. In addition, lithium-ion secondary batteries are assembled in a dry room from which atmospheric moisture is maximally eliminated (for example, having a dew point equal to or lower than −40° C.).

In this manner, in order to minimize the quantity of moisture included in a lithium-ion secondary battery, the quantity of moisture in members used in a battery is required to be managed strictly.

As a method of measuring the quantity of moisture in such members, there is the Karl Fischer's moisture quantity determination method. In the Karl Fischer's moisture quantity determination method, for example, the amperage flowing in accordance with the chemical reaction below is precisely monitored and the quantity of moisture included in a member is measured.

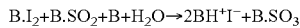

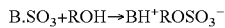

In a case where the quantity of moisture in a member is measured, a vaporization apparatus is used for sufficiently heating the member and vaporizing moisture from the member. Examples of such a vaporization apparatus include a type in which a measurement sample is put in a boat and is measured, and a type in which a measurement sample is put in a vial bottle and is measured. In an apparatus of the type in which a measurement sample is put in a boat and is measured, there is a need to perform an operation of switching the sample after a measurement. In contrast, in a vial bottle-type apparatus, measurements can be performed by automatically replacing the sample. Therefore, the quantity of moisture in a member can be efficiently measured by using the vial bottle-type apparatus.

Examples of a technology related to such a vial bottle-type apparatus include technologies disclosed in Patent Document 1 (Japanese Unexamined Patent Publication No. H7-43371) and Patent Document 2 (Japanese Unexamined Patent Publication No. H7-43268).

The apparatuses disclosed in those Patent Documents include a turntable, a mechanism for switching a vial bottle, and a mechanism for lifting and lowering the vial bottle. In addition, the apparatuses include a mechanism for selecting a vial bottle having a measurement sample therein, inserting the selected vial bottle into a set heater unit, and heating the vial bottle to a set temperature.

In such apparatuses, inert gas is introduced to the inside of the selected vial bottle, moisture vaporized from the measurement sample is sent to the inside of a Karl Fischer moisture meter together with the inert gas, and the quantity of moisture included in the inert gas is measured. Accordingly, the quantity of moisture in the measurement sample can be determined. In these apparatuses, as long as the measurement sample can be inserted into the vial bottle, it is possible to measure moldings, powder, liquid, and the like unless a substance hindering Karl Fischer reaction is generated.

Generally, the apparatuses disclosed in those Patent Documents manage the quantity of moisture in a member such as an electrode and a separator of a lithium-ion secondary battery.

RELATED DOCUMENT

Patent Document

[Patent Document 1] Japanese Unexamined Patent Publication No. H7-43371
[Patent Document 2] Japanese Unexamined Patent Publication No. H7-43268

SUMMARY OF THE INVENTION

Technical Problem

Upon investigation of the inventors, it has become clear that in methods of measuring a quantity of moisture in the related art using apparatuses disclosed in Patent Document 1 (Japanese Unexamined Patent Publication No. H7-43371), Patent Document 2 (Japanese Unexamined Patent Publication No. H7-43268), and the like, it takes time to heat a sheet-shaped measurement target sample, such as an electrode used for a lithium-ion secondary battery, to a particular temperature so that it is difficult to measure the amount of adsorption water escaping within a particular temperature range, in a short period of time.

In addition, it has become clear that in methods of measuring a quantity of moisture in the related art, temperature irregularity is likely to occur inside a measurement target sample (for example, inside an electrode) so that it is difficult to accurately control the temperature of a measurement target sample (for example, the temperature of an electrode) to a particular temperature.

A first aspect of the present invention has been made in consideration of the foregoing circumstances and provides a method of measuring a quantity of moisture in an electrode, in which the amount of adsorption water escaping within a particular temperature range can be measured accurately in a short period of time.

In addition, a second aspect of the present invention has been made in consideration of the foregoing circumstances and provides a moisture quantity measuring apparatus and a method of measuring a moisture quantity, in which the amount of adsorption water escaping within a particular temperature range can be measured accurately in a short period of time.

Solution to Problem

The inventor has intensively and repetitively investigated in order to achieve the objects described above. As a result, it has been found that the amount of adsorption water escaping within a particular temperature range can be measured accurately in a short period of time by using inert gas heated to a predetermined temperature in advance, and a first aspect of the present invention and a second aspect of the present invention have been completed.

According to the first aspect of the present invention, there is provided a method of measuring a quantity of moisture in an electrode including a step of disposing an electrode, which is a measurement target sample, inside a container provided with a gas introduction pipe and a gas discharge pipe, a step of heating the electrode by supplying inert gas heated to a predetermined temperature in advance to the inside of the container through the gas introduction pipe and vaporizing moisture adsorbed to the electrode, and a step of collecting the moisture vaporized from the electrode, together with the inert gas through the gas discharge pipe and determining the quantity of the collected moisture.

When inert gas heated to a predetermined temperature in advance is used, the inert gas having a predetermined temperature can be directly applied to the electrode which is a measurement target sample. Accordingly, the electrode can promptly reach a particular temperature.

In addition, since the inert gas having a predetermined temperature is applied to the entire electrode, temperature irregularity is unlikely to occur inside the electrode, and the temperature of the electrode can be controlled to a particular temperature to a high degree. Accordingly, it is possible to accurately measure the amount of adsorption water escaping within a particular temperature range.

Therefore, according to the method of measuring a quantity of moisture in an electrode of the first aspect of the present invention, the temperature of an electrode can accurately reach a particular temperature in a short period of time, so that it is possible to accurately obtain the moisture quantity of adsorption water escaping within a particular temperature range, in a short period of time.

In addition, according to the first aspect of the present invention, there is provided a method of manufacturing an electrode for a lithium-ion secondary battery including a step of producing an electrode including an electrode active material, and a step of measuring the quantity of moisture in the electrode by using the method of measuring a quantity of moisture in an electrode.

According to the second aspect of the present invention, there is provided a moisture quantity measuring apparatus including a container that has a gas introduction pipe and a gas discharge pipe and accommodates a measurement target sample, a heating unit that heats the measurement target sample by supplying the inert gas heated to a predetermined temperature in advance to the inside of the container through the gas introduction pipe and vaporizes moisture adsorbed to the measurement target sample, and a moisture quantity measuring unit that collects the moisture vaporized from the measurement target sample, through the gas discharge pipe and determines the quantity of the collected moisture.

When inert gas heated to a predetermined temperature in advance is used, the inert gas having a predetermined temperature can be directly applied to the measurement target sample. Accordingly, the measurement target sample can promptly reach a particular temperature.

In addition, since the inert gas having a predetermined temperature is applied to the entire measurement target sample, temperature irregularity is unlikely to occur inside the measurement target sample, and the temperature of the measurement target sample can be controlled to a particular temperature to a high degree. Accordingly, it is possible to accurately measure the amount of adsorption water escaping within a particular temperature range.

Therefore, according to the moisture quantity measuring apparatus of the second aspect of the present invention, the temperature of the measurement target sample can accurately reach a particular temperature in a short period of time, so that it is possible to accurately obtain the moisture quantity of adsorption water escaping within a particular temperature range, in a short period of time.

In addition, according to the second aspect of the present invention, there is provided a method of measuring a quantity of moisture in a measurement target sample using the moisture quantity measuring apparatus. The method includes a step of disposing a measurement target sample inside a container, a step of causing the heating unit to heat the measurement target sample by supplying inert gas heated to a predetermined temperature in advance to the inside of the container through the gas introduction pipe and to vaporize moisture adsorbed to the measurement target sample, and a step of collecting the moisture vaporized from the measurement target sample, together with the inert gas through the gas discharge pipe and causing the moisture quantity measuring unit to determine the quantity of the collected moisture.

Advantageous Effects of Invention

According to the first aspect of the present invention, it is possible to provide the method of measuring a quantity of moisture in an electrode, in which the amount of adsorption water escaping within a particular temperature range can be measured accurately in a short period of time.

According to the second aspect of the present invention, it is possible to provide the moisture quantity measuring apparatus and the method of measuring a moisture quantity, in which the amount of adsorption water escaping within a particular temperature range can be measured accurately in a short period of time.

BRIEF DESCRIPTION OF THE DRAWINGS

The objects, other objects, the features, and the advantages described above become clearer by preferable embodiments and the accompanying drawings described below.

DESCRIPTION OF EMBODIMENTS

Figure 1:
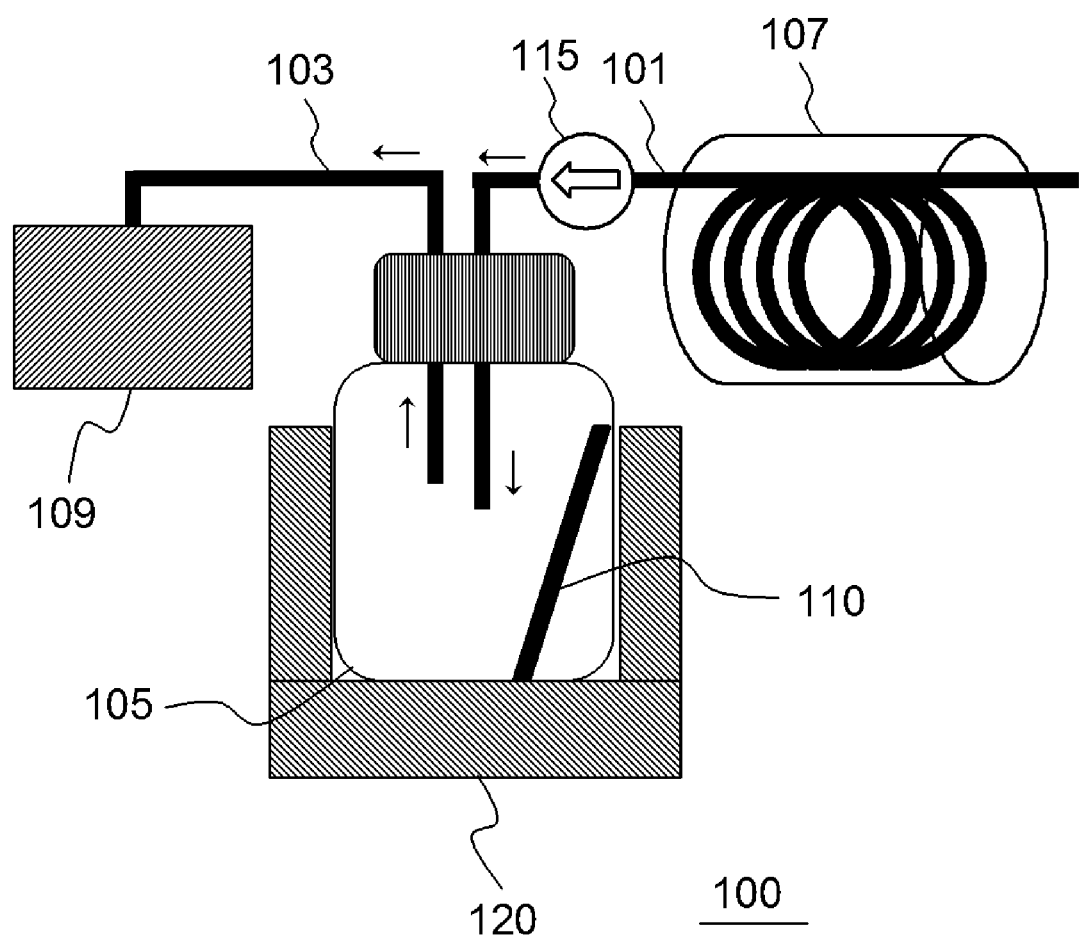
FIG. 1 is a cross-sectional view illustrating an example of a configuration of a moisture quantity measuring apparatus according to an embodiment of the present invention.

Hereinafter, embodiments of the present invention will be described using the drawings. In all of the drawings, common reference signs will be applied to similar constituent elements, and description will not be repeated. In addition, in diagrams, being different from the actual dimensions, the shape, the size, and the disposition relationship are schematically illustrated for each of the constituent elements to the extent that the present invention can be understood. Unless otherwise noted, "to" between numbers in sentences indicates a range from equal to or more than a number to equal to or less than the other number.

[First Aspect of Invention]

Hereinafter, an embodiment according to a first aspect of the invention will be described.

<Method of Measuring Moisture Quantity of Electrode>

First, a method of measuring a quantity of moisture in an electrode of the present embodiment will be described.

The method of measuring a quantity of moisture in an electrode of the present embodiment includes at least three steps (A) to (C) as follows:

(A) a step of disposing an electrode 110, which is a measurement target sample, inside a container 105 provided with a gas introduction pipe 101 and a gas discharge pipe 103;

(B) a step of heating the electrode 110 by supplying inert gas heated to a predetermined temperature in advance to the inside of the container 105 through the gas introduction pipe 101, and vaporizing moisture adsorbed to the electrode 110; and (C) a step of collecting the moisture vaporized from the electrode 110, together with the inert gas through the gas discharge pipe 103 and determining the quantity of the collected moisture.

According to the method of measuring a quantity of moisture in an electrode of the present embodiment, when at least the three steps (A) to (C) described above are included, the temperature of an electrode can accurately reach a particular temperature in a short period of time, so that it is possible to obtain, with high accuracy, the moisture quantity of adsorption water escaping within a particular temperature range.

Hereinafter, each of the steps will be described.

[(A) Step of Disposing Electrode]

First, the electrode 110 which is a measurement target sample is disposed inside the container 105 provided with the gas introduction pipe 101 and the gas discharge pipe 103. In this case, the number of electrodes 110 to be disposed is not particularly limited. One or more electrodes 110 may be disposed.

For example, the electrode 110 is a sheet-shaped electrode and is preferably a positive electrode or negative electrode for a lithium-ion secondary battery.

Since a sheet-shaped member has a small contact surface area with respect to the container 105, heat from the container 105 is unlikely to be transferred. Therefore, in a case of a sheet-shaped electrode 110, heat is unlikely to be transferred sufficiently by only the heat conduction through contact on the inner side of the container 105. Accordingly, the effect of the present embodiment can be achieved more effectively.

Particularly, in the positive electrode or the negative electrode for a lithium-ion secondary battery, since the member itself is a sheet-shaped member having low heat conductivity, the effect of the present embodiment can be achieved more effectively.

Figure 2:
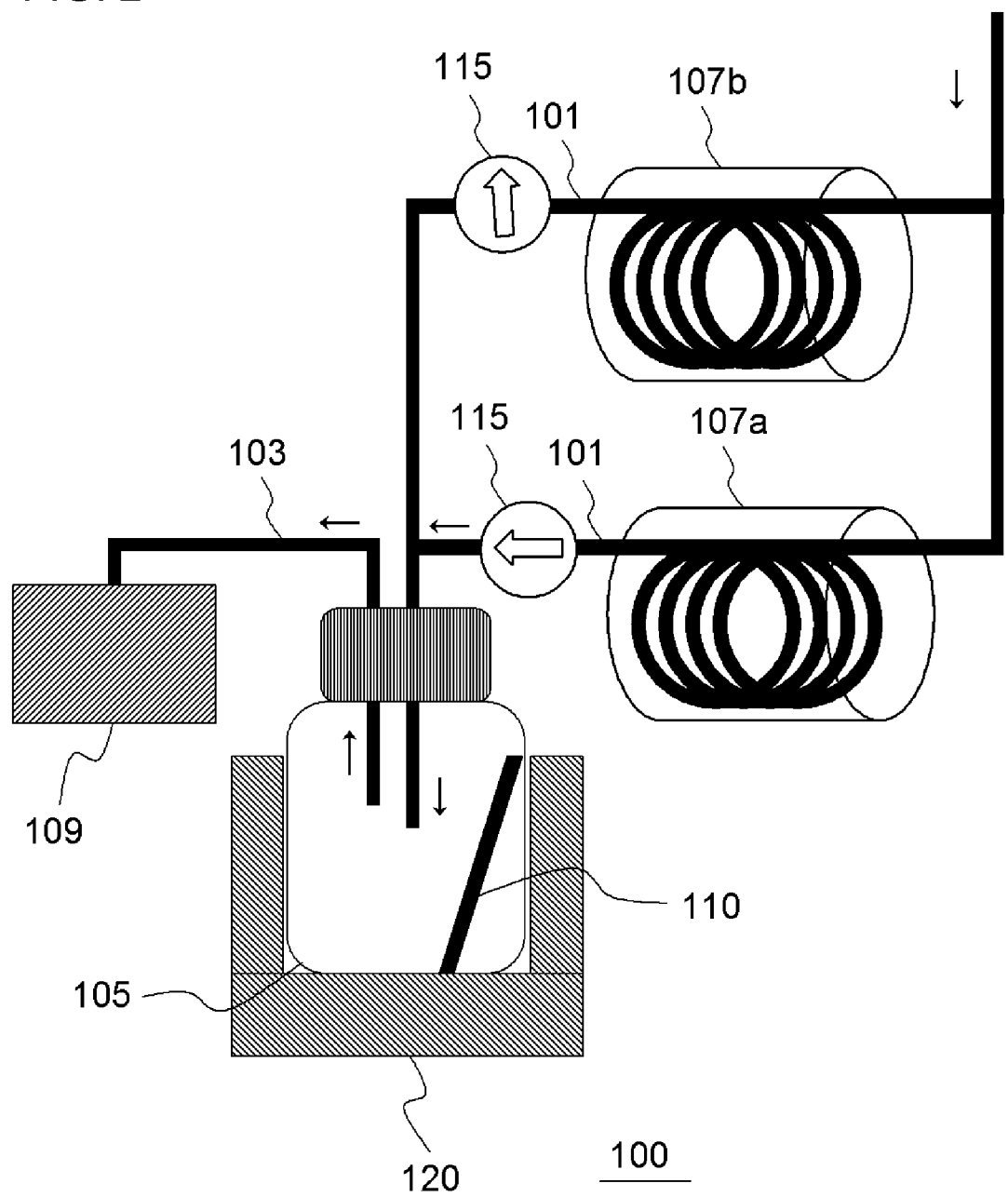
FIG. 2 is a cross-sectional view illustrating another example of the configuration of the moisture quantity measuring apparatus according to the embodiment of the present invention.
Figure 3:
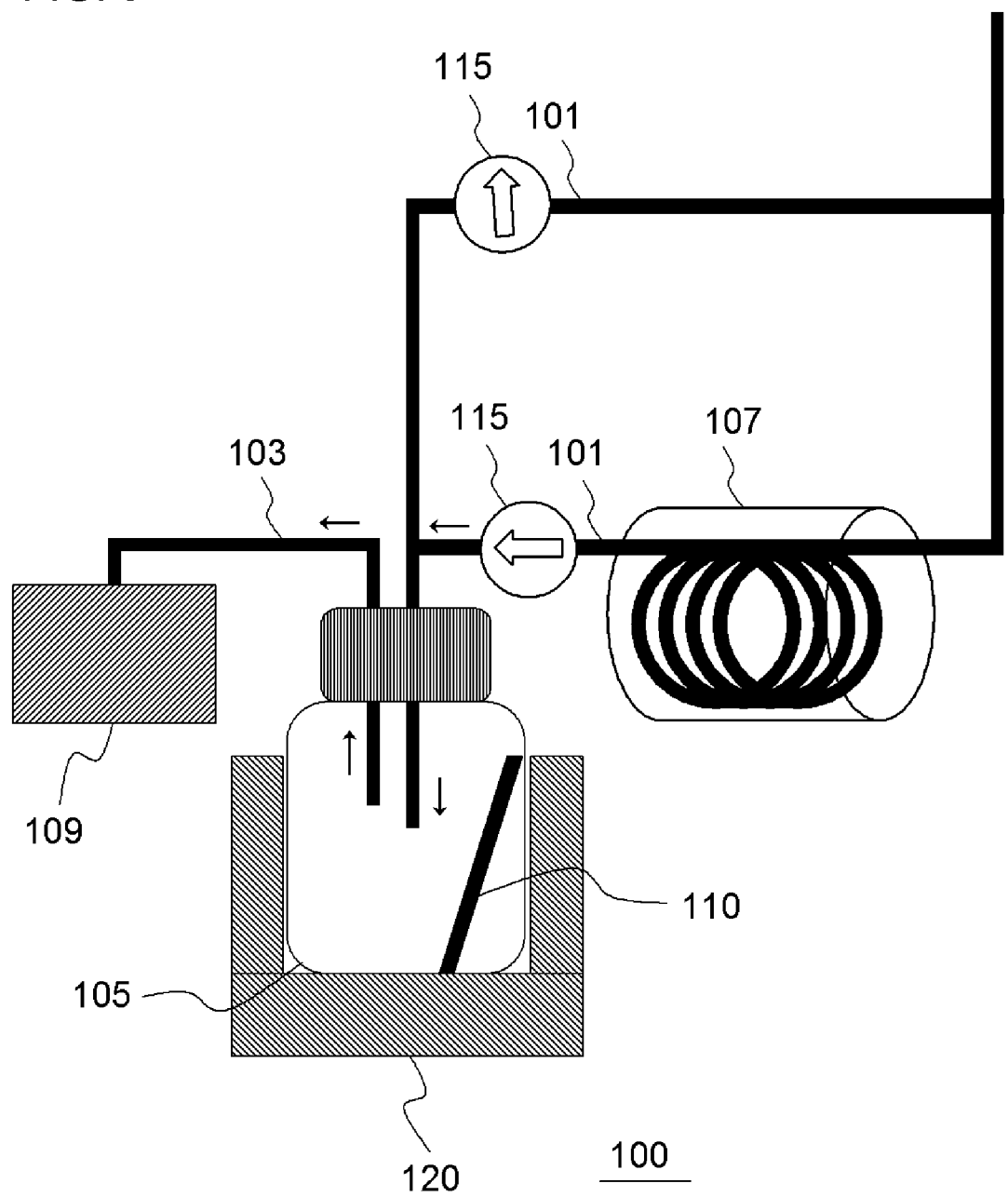
FIG. 3 is a cross-sectional view illustrating an example of a configuration of a moisture quantity measuring apparatus according to another embodiment of the present invention.

FIGS. 1 to 3 are cross-sectional views illustrating examples of a configuration of a moisture quantity measuring apparatus 100 according to the embodiment of the present invention.

The moisture quantity measuring apparatus 100 includes the container 105 that has the gas introduction pipe 101 and the gas discharge pipe 103 and accommodates the electrode 110 which is a measurement target sample, a heating unit 107 that heats the electrode 110 by supplying inert gas heated to a predetermined temperature in advance to the inside of the container 105 through the gas introduction pipe 101 and vaporizes moisture adsorbed to the electrode 110, and a moisture quantity measuring unit 109 that collects the moisture vaporized from the electrode 110 through the gas discharge pipe 103 and determines the quantity of the collected moisture.

In addition, as necessary, a heating unit 120 which directly heats the container 105 can be provided on the periphery of the container 105.

It is desirably that the moisture quantity measuring apparatus 100 is installed in a dry room having a dew point equal to or lower than −30° C. at which the apparatus is less likely to be affected by moisture.

The material of the container 105 is not particularly limited. However, for example, the container 105 is formed of heat resistant materials including heat resistant glass such as borosilicate glass and quartz glass; and stainless steel. As a cap of the container 105, it is preferable to use a cap produced by using a material which is soft and excellent in heat resistance, such as polytetrafluoroethylene (PTFE).

In addition, the shape and the size of the container 105 are not particularly limited. The shape and the size thereof are suitably determined depending on the size or the throughput of the electrode 110 to be subjected to measurement of the moisture quantity.

In addition, FIGS. 1 to 3 illustrate examples in which the gas introduction pipe 101 and the gas discharge pipe 103 are connected to an upper portion of the container 105. However, the connection portions are not particularly limited and may be a side portion and an upper portion of the container 105.

The configuration of disposing the electrode 110 inside the container 105 is not particularly limited. However, examples thereof include a configuration in which the electrode 110 leans against the inner wall of the container 105. Accordingly, inert gas is easily supplied to both surfaces of the electrode 110.

In addition, in a case where the electrode 110 is an electrode for a lithium-ion secondary battery, for example, the electrode 110 can be cut into a quadrangular shape ranging from several square millimeters to several square centimeters, can be weighed precisely using an electronic balance (not illustrated in the drawings), and can be disposed inside the container 105.

[(B) Step of Vaporizing Moisture]

Next, the electrode 110 is heated by supplying inert gas heated to a predetermined temperature in advance to the inside of the container 105 through the gas introduction pipe 101, and moisture adsorbed to the electrode 110 is vaporized.

The inert gas is supplied from a container (not illustrated in the drawings) filled with the inert gas to the inside of the container 105 through the gas introduction pipe 101. A flowmeter may be attached to the gas introduction pipe 101. The gas flow rate may be controlled with the flowmeter. In addition, the gas introduction pipe 101 may be provided with a valve 115 such that the gas supply can switch between ON and OFF.

Here, the inert gas is heated to a predetermined temperature by the heating unit 107 installed between the container filled with the inert gas and the container 105.

The heating unit 107 is not particularly limited. However, for example, a known heating device using a heat source, such as a heater and a halogen lamp can be used. Any heating device may be employed as long as the inert gas can be heated.

The inert gas is not particularly limited as along as the gas is inactive with respect to the electrode 110 in a high-temperature state. However, for example, one or more selected from nitrogen gas, helium gas, and argon gas can be used. Among these, from the viewpoint of low price, nitrogen gas is particularly preferable. From the viewpoint of more precisely measuring the quantity of moisture in the electrode 110, it is preferable that the inert gas is sufficiently dehydrated using silica gel, molecular sieve, Sicapent, or the like before use.

Here, methods in the related art disclosed in Patent Document 1 (Japanese Unexamined Patent Publication No. H7-43371), Patent Document 2 (Japanese Unexamined Patent Publication No. H7-43268), and the like require a long period of time. However, for example, it has been possible to accurately measure the quantity of moisture in a member to which only physical adsorption water is adsorbed, such as a separator, a tub, and an exterior material which are constituent members of a lithium-ion secondary battery. However, upon investigation of the inventors, it has become clear that in the methods in the related art, it is difficult to individually and accurately measure moisture in adsorption forms different from each other with respect to a member to which not only physical adsorption water but also chemical adsorption water is adsorbed, that is, a member to which two or more kinds of moisture in adsorption forms different from each other are adsorbed, in a short period of time as in an electrode for a lithium-ion secondary battery.

It is assumed that although vial bottle-type apparatuses in the related art have sufficient measurement accuracy of the moisture quantity, since accuracy of a measurement temperature is poor, it is difficult to clearly isolate the chemical adsorption water and the physical adsorption water from each other. For example, in a case where the quantity of moisture in an electrode of a lithium-ion secondary battery is measured using a vial bottle-type apparatus, a method as described below is employed. The electrode is cut into a certain size, and the mass is precisely measured using an electronic balance. Then, the electrode is finely cut and is inserted into a vial bottle. Thereafter, the vial bottle is covered with a lid and is set to the apparatus. Predetermined conditions are set, the moisture quantity is measured, and the moisture percentage is thereby obtained from the mass measured in advance.

In this case, if there is only moisture such as physical adsorption water attached to the outermost surface of a member (measurement sample), all moisture escapes by setting the temperature to be higher than the boiling point of water, so that the moisture quantity can be precisely measured. However, in a case where chemical adsorption water is also adsorbed in addition to physical adsorption water, it is difficult to precisely measure each of the moisture quantities by only setting the temperature to be higher than the boiling point of water.

Since the influences of the physical adsorption water and the chemical adsorption water are different from each other inside a battery, the physical adsorption water and the chemical adsorption water are required to be precisely isolated and measured. In a case of a vial bottle-type apparatus, a unit which heats the entire vial bottle by means of a heater is often employed. In this case, although the vial bottle itself reaches a predetermined temperature, the measurement sample is not always at the temperature. If the measurement sample is in a form of powder or has high heat conductivity, there are cases where the measurement sample is sufficiently heated by only the heat conduction through contact on the inner side of the vial bottle and reaches a predetermined temperature. However, since an electrode of a lithium-ion secondary battery has poor heat conductivity, heat is not sufficiently transferred by only the heat conduction from the vial bottle.

Meanwhile, in a Karl Fischer moisture meter, moisture vaporized from a measurement sample is introduced into an electrolytic solution for Karl Fischer reaction. Therefore, the vial bottle is required to be purged with inert gas. In such a device, there are many cases where nitrogen gas dried by means of a strong drying material (silica gel, molecular sieve, Sicapent, or the like) is introduced. In such a device, since nitrogen gas is at the ambient temperature (room temperature), the nitrogen gas is directly sprayed to the sample so as to cool the sample. As a result, the rate of temperature rise of the measurement sample drops, or the temperature does not reach a predetermined temperature, thereby being saturated at a temperature which is lower than the set temperature by several tens of degrees (where heating by the heater and cooling by the nitrogen gas are balanced), resulting in difficulties measuring the moisture quantity at the desired temperature which has been set.

The inventor has intensively and repetitively investigated in order to achieve the objects described above. As a result, it has been found that moisture in adsorption forms different from each other can be measured individually and accurately in a short period of time by utilizing inert gas having heating temperatures different from each other.

That is, in a case where the electrode 110 which is a measurement target sample includes two or more kinds of moisture in adsorption forms different from each other, moisture in adsorption forms different from each other can be measured individually and accurately in a short period of time by utilizing inert gas having heating temperatures different from each other.

For example, in a case where the electrode 110 which is a measurement target sample includes primary region water and secondary region water having adsorption forms different from each other, the step of vaporizing moisture can include a step of heating the electrode 110 by supplying first inert gas heated to a predetermined temperature in advance to the inside of the container 105 through the gas introduction pipe 101, and vaporizing primary region water adsorbed to the electrode 110, and a step of further heating the electrode 110 by supplying second inert gas heated to a temperature higher than the temperature of the first inert gas to the inside of the container 105 through the gas introduction pipe 101, and vaporizing secondary region water adsorbed to the electrode 110 after the step of vaporizing primary region water. In this manner, moisture in adsorption forms different from each other can be measured individually and accurately in a short period of time.

Here, examples of the primary region water can include physical adsorption water. In addition, examples of the secondary region water can include chemical adsorption water.

For example, in a case where the electrode 110 which is a measurement target sample includes the primary region water and the secondary region water having adsorption forms different from each other, in the step of vaporizing moisture, as illustrated in FIG. 2, a first heating unit 107a can heat the electrode 110 by supplying the first inert gas heated to a predetermined temperature in advance to the inside of the container 105 through the gas introduction pipe 101 and can vaporize the primary region water adsorbed to the electrode 110, and a second heating unit 107b can further heat the electrode 110 by supplying the second inert gas heated to a temperature higher than the temperature of the first inert gas to the inside of the container 105 through the gas introduction pipe 101 and can vaporize the secondary region water adsorbed to the electrode 110.

From the viewpoint of simplifying the apparatus, it is preferable that the second heating unit 107b is configured to be the same as the first heating unit 107a except for being used at a temperature higher than that of the first heating unit 107a.

For example, as the first inert gas and the second inert gas, one or more selected from nitrogen gas, helium gas, and argon gas can be used. Among these, from the viewpoint of low price, nitrogen gas is particularly preferable. From the viewpoint of more precisely measuring the quantity of moisture in the electrode 110, it is preferable that the first inert gas and the second inert gas are sufficiently dehydrated using silica gel, molecular sieve, or the like before use.

In the step of vaporizing primary region water, for example, from the viewpoint of more accurately vaporizing only the physical adsorption water, it is more preferable that heating is performed to a range from equal to or higher than 150° C. to equal to or lower than 220° C.

In the step of vaporizing secondary region water, from the viewpoint of more accurately vaporizing only the chemical adsorption water, it is more preferable that heating is performed to a range from equal to or higher than 250° C. to equal to or lower than 350° C.

In addition, in the step of vaporizing moisture, it is preferable that $(T_2-T_1)$ ranges from equal to or higher than 0° C. to equal to or lower than 50° C. when the temperature of directly heating the container 105 is $T_1$ [° C.] and the temperature of the inert gas is $T_2$ [° C.]. Accordingly, the temperature of the electrode 110 can be raised to a target temperature in a shorter period of time, and moisture in the electrode 110 having adsorption forms different from each other can be measured individually and accurately in a short period of time.

Here, for example, the heating unit 120 can be used for heating the container 105. The heating unit 120 is not particularly limited. However, for example, a known heating device using a heat source, such as a heater and a halogen lamp can be used. Any heating device may be employed as long as the container 105 can be heated.

[(C) Step of Determining Quantity of Moisture]

Next, moisture vaporized from the electrode 110 is collected together with the inert gas through the gas discharge pipe 103, and the quantity of the collected moisture is determined.

The gas discharge pipe 103 is connected to the moisture quantity measuring unit 109. Accordingly, moisture vaporized from the electrode 110 is collected from the container 105 together with the inert gas through the gas discharge pipe 103, and moisture which is a measurement subject can be introduced to the moisture quantity measuring unit 109.

The step of determining the quantity of the collected moisture is not particularly limited. For example, the quantity of moisture can be determined by a known method such as a Karl Fischer's moisture quantity determination method, a loss-on-drying method, an infrared absorbing method, and a gas chromatography method. Among these, from the viewpoint of being accurate and being capable of measuring in a short period of time, the Karl Fischer's moisture quantity determination method is preferable. That is, as the moisture quantity measuring unit 109, the Karl Fischer moisture meter is preferable.

Here, in order to prevent inert gas including moisture vaporized from the electrode 110 from being cooled and adhering to an inner side of piping of the gas discharge pipe 103, it is preferable that the inert gas including moisture is heated.

In addition, there is a possibility that high-temperature gas will enter the Karl Fischer moisture meter and a Karl Fischer reagent is at a high temperature and deteriorates. Therefore, in the present embodiment, it is preferable that the gas discharge pipe 103 is provided with a thermoelectric couple, the gas is cooled by a gas temperature adjusting function (not illustrated in the drawings) provided in the gas discharge pipe 103 such that the gas temperature does not become excessively high, and then the inert gas including vaporized moisture is introduced the Karl Fischer moisture meter.

However, when the temperature of the inert gas including vaporized moisture drops excessively, moisture adheres to the gas discharge pipe 103 and causes an error. Therefore, in order to prevent the inert gas from being excessively cooled, it is preferable that a fan (not illustrated in the drawings) is installed in the piping, and the temperature is controlled by monitoring the temperature with the thermoelectric couple.

In a case where the electrode 110 which is a measurement target sample includes the primary region water and the secondary region water escaping within temperature ranges different from each other, for example, the step of determining the quantity of moisture can include the step of determining the quantity of the primary region water and the step of determining the quantity of the secondary region water. In this manner, the quantity can be determined by dividing the measurement subject into the primary region water and the secondary region water.

Next, a procedure of measuring the quantity of moisture in an electrode using the method of measuring a quantity of moisture in an electrode of the present embodiment will be described in detail with reference to FIGS. 2 and 3.

Example 1

Hereinafter, the procedure will be described with reference to FIG. 2. First, a measurement target sample is prepared. An electrode of a lithium-ion secondary battery is cut into a designated size and is weighed.

For example, it is favorable that the size of the electrode ranges approximately from 0.3 g to 2.0 g. The reason is that a small quantity causes an error and a large quantity hinders purge gas from sufficiently spreading and results in an extended measurement time. The electrode is cut into a quadrangular shape ranging from several square millimeters to several square centimeters so as to be the electrode 110 which is a measurement target sample, and is inserted into the container 105. Thereafter, the container 105 is covered with the cap.

The container 105 is prepared in advance as many as the number of samples to be measured at the same time, and the container 105 for purge having no electrode 110 is also prepared. Next, the first heating unit 107a and the second heating unit 107b are set.

For example, the first heating unit 107a measuring the primary region water (physical adsorption water) is set to range from 150° C. to 220° C. For example, the second heating unit 107b measuring the secondary region water (chemical adsorption water) is set to range from 250° C. to 350° C. For example, the heating unit 120 is set to the same temperature as that of the first heating unit 107a.

Next, the inert gas flow rate, the measurement time, and the like are set in accordance with the properties of the electrode 110. It is favorable that the inert gas flow rate ranges approximately from 200 cc/min to 500 cc/min. The measurement time ends when the currently measuring moisture quantity becomes substantially 0 µg/sec.

The measurement method is performed under the following procedure.

First, the container 105 having no electrode 110 is prepared and the container 105 is set inside the heating unit 120. Subsequently, the first inert gas heated by the first heating unit 107a is caused to flow into the container 105 through the gas introduction pipe 101. The gas is caused to flow into the moisture quantity measuring unit 109 as well, and moisture remaining inside the inner side of piping or the moisture quantity measuring unit 109 is eliminated while background titration is performed.

Next, the container 105 accommodating the electrode 110 which is a measurement target sample is set to the heating unit 120. Subsequently, the first inert gas heated by the first heating unit 107a is caused to flow into the container 105 through the gas introduction pipe 101. The gas which has flowed is introduced to the moisture quantity measuring unit 109 together with moisture vaporized from the electrode 110 through the gas discharge pipe 103. The moisture quantity measuring unit 109 measures the amount of the primary region water (physical adsorption water) vaporized from the electrode 110.

Next, an inert gas line is switched to the second heating unit 107b side by using the valve 115. In the same manner, the second inert gas heated by the second heating unit 107b is caused to flow into the container 105 through the gas introduction pipe 101. The gas which has flowed is introduced to the moisture quantity measuring unit 109 together with moisture vaporized from the electrode 110 through the gas discharge pipe 103. The moisture quantity measuring unit 109 measures the amount of the secondary region water (chemical adsorption water) vaporized from the electrode 110.

The result is recorded in a control unit (not illustrated in the drawings) or is printed out such that data is retained. Thereafter, the gas line is disconnected, and the container 105 is taken out from the heating unit 120. Subsequently, a next measurement sample is measured under the same procedure. The series of operations can also be conducted such that samples are automatically replaced through automatic sample replacement.

In Example 1, the first heating unit 107a and the second heating unit 107b are provided as heating units. However, three or more heating units may be provided for a subdivided analysis.

Example 2

Hereinafter, the procedure will be described with reference to FIG. 3. In this Example, the form of the configuration described using FIG. 2 is partially changed. Parts different from Example 1 will be mainly described, and the description of parts in common with Example 1 will not be repeated herein. In this Example, the heating unit 120 is used as a heating unit measuring the primary region water (physical adsorption water), and the heating unit 107 is used as a heating unit measuring the secondary region water (chemical adsorption water).

Although this Example requires a measurement time longer than that in Example 1 but has a merit in that the configuration can be simplified.

The measurement method is performed under the following procedure.

The procedure from the preparation of a sample to the operation of eliminating moisture remaining on the inner side of piping or inside the moisture quantity measuring unit 109 is the same as that in Example 1. However, for example, the heating unit 120 measuring the primary region water (physical adsorption water) is set to range from 150° C. to 220° C. For example, the heating unit 107 measuring the secondary region water (chemical adsorption water) is set to range from 250° C. to 350° C.

Next, the container 105 accommodating the electrode 110 which is a measurement target sample is set to the heating unit 120. Subsequently, the inert gas, which is not heated, is caused to flow into the container 105 through the gas introduction pipe 101. The gas which has flowed is introduced to the moisture quantity measuring unit 109 together with moisture vaporized from the electrode 110 through the gas discharge pipe 103. The moisture quantity measuring unit 109 measures the amount of the primary region water (physical adsorption water) vaporized from the electrode 110.

Next, the inert gas line is switched to the heating unit 107 side by using the valve 115. Subsequently, the inert gas heated by the heating unit 107 is caused to flow into the container 105 through the gas introduction pipe 101. The gas which has flowed is introduced to the moisture quantity measuring unit 109 together with moisture vaporized from the electrode 110 through the gas discharge pipe 103. The moisture quantity measuring unit 109 measures the amount of the secondary region water (chemical adsorption water) vaporized from the electrode 110.

The result is recorded in a control unit (not illustrated in the drawings) or is printed out such that data is retained. Thereafter, the gas line is disconnected, and the container 105 is taken out from the heating unit 120. Subsequently, a next measurement sample is measured under the same procedure. The series of operations can also be conducted such that samples are automatically replaced through automatic sample replacement.

<Method of Manufacturing Electrode for Lithium-Ion Secondary Battery>

Next, a method of manufacturing an electrode for a lithium-ion secondary battery of the present embodiment will be described.

The method of manufacturing an electrode for a lithium-ion secondary battery of the present embodiment includes at least two steps (1) and (2) and may further include step (3) as follows:

(1) a step of producing the electrode 110 including an electrode active material;

(2) a step of measuring the quantity of moisture in the electrode 110 using the method of measuring a quantity of moisture in an electrode of the present embodiment; and (3) a sorting step of sorting out an electrode 110 appraised to be acceptable by appraising the quality of the electrode 110 based on obtained information on the quantity of moisture in the electrode 110.

According to the method of manufacturing an electrode for a lithium-ion secondary battery of the present embodiment, it is possible to realize stabilization and high reliability of the quality of the electrode for a lithium-ion secondary battery.

In the lithium-ion secondary battery, management of the quantity of moisture included in an electrode is particularly important. The moisture includes physical adsorption water which is only attached to the surface and chemical adsorption water which is adsorbed due to chemical reaction. Most of the physical adsorption water can be eliminated by drying for approximately several hours at a temperature equal to or higher than 150° C. in a vacuum or under the inert gas. Meanwhile, the chemical adsorption water is unlikely to be removed by heating and drying.

For example, such chemical adsorption water is included in a positive electrode active material. When the amount of the chemical adsorption water increases, gassiness, cycle deterioration, or retention deterioration occurs while a battery cell is in use. Therefore, the amount of chemical adsorption water is required to be strictly managed during a production step.

In the method of measuring a quantity of moisture in an electrode of the present embodiment, the temperature of an electrode can accurately reach a particular temperature in a short period of time, and it is possible to accurately obtain the moisture quantity of chemical adsorption water escaping within a particular temperature range, in a short period of time. Therefore, according to the method of manufacturing an electrode for a lithium-ion secondary battery of the present embodiment, it is possible to manufacture an electrode for a lithium-ion secondary battery, in which the amount of chemical adsorption water is equal to or less than a management standard value and which is excellent in quality, in a stable manner with high efficiency.

In addition, according to the method of manufacturing an electrode for a lithium-ion secondary battery of the present embodiment, it is possible to more accurately obtain the moisture quantity of chemical adsorption water escaping within a particular temperature range, in a shorter period of time by using the moisture quantity measuring apparatus 100 provided with the first heating unit 107a and the second heating unit 107b as illustrated in FIG. 2. For example, it is possible to efficiently measure only the chemical adsorption water by measuring the physical adsorption water using the first heating unit 107a and switching the inert gas to the second heating unit 107b on the high-temperature side without any change.

Hereinafter, each of the steps will be described.

[(1) Step of Producing Electrode including Electrode Active Material]

The electrode 110 including an electrode active material can be produced in accordance with a known method. Accordingly, the method is not particularly limited. However, for example, the electrode 110 including an electrode active material can be manufactured as follows.

First, electrode slurry is prepared.

Electrode slurry of the present embodiment can be prepared in accordance with a generally known method. Accordingly, the preparation is not particularly limited. However, for example, electrode slurry can be prepared by mixing an electrode active material with other materials such as a binder, a thickener, and a conductive assistant which are compounded as necessary, using a mixer, and causing the mixture to be dispersed or dissolved in a solvent or an aqueous medium. The mixture ratio of materials in the electrode slurry is suitably determined in accordance with the purpose of use or the like of a battery.

As the mixer, a known mixer such as a ball mill and a planetary mixer can be used. Accordingly, the mixer is not particularly limited. The mixing method is not particularly limited either, and mixing can be performed in accordance with a known method.

A generally known material can be used as the electrode active material used in the present embodiment. The electrode active material is suitably selected in accordance with the purpose of use or the like of a battery. In addition, when a positive electrode is produced, a positive electrode active material is used, and when a negative electrode is produced, a negative electrode active material is used.

The positive electrode active material of the present embodiment is not particularly limited as long as the material is an ordinary positive electrode active material which can be used for a positive electrode of a lithium-ion secondary battery. However, for example, it is possible to use a material which can reversibly release and store lithium ion and has high electron conductivity such that electron transport can be easily carried out. Examples of the positive electrode active material include composite oxide of lithium and transition metal, such as lithium-nickel composite oxide, lithium-cobalt composite oxide, lithium-manganese composite oxide, lithium-manganese-nickel composite oxide, and lithium-nickel-cobalt-aluminum composite oxide; transition metal sulfide such as $TiS_2$, $FeS$, and $MoS_2$; transition metal oxide such as $MnO$, $V_2O_5$, $V_6O_{13}$, and $TiO_2$; and olivine-type lithium phosphorus oxide.

Here, particularly a positive electrode active material including nickel, such as lithium-nickel composite oxide, lithium-manganese-nickel composite oxide, and lithium-nickel-cobalt-aluminum composite oxide is likely to be affected by moisture. Therefore, in a case where a positive electrode active material including nickel is used, the method of manufacturing an electrode for a lithium-ion secondary battery of the present embodiment is particularly effective.

The negative electrode active material of the present embodiment is not particularly limited as long as the material is an ordinary negative electrode active material which can be used for a negative electrode of a lithium-ion secondary battery. However, examples of the negative electrode active material include carbon materials such as natural graphite, artificial graphite, resin charcoal, carbon fiber, activated carbon, hard carbon, and soft carbon; lithium-based metal such as lithium metal and lithium alloy; metal such as silicon and tin; conductive polymers such as polyacene, polyacetylene, and polypyrrole.

The electrode slurry of the present embodiment may further include a binder which plays a role of binding the electrode active materials, and an electrode active material and a current collector together.

The binder of the present embodiment is not particularly limited as long as the binder is an ordinary binder which can be used for a lithium-ion secondary battery. However, Examples of the binder include polyvinyl alcohol, polyacrylic acid, carboxymethyl cellulose, polytetrafluoroethylene, polyvinylidene fluoride, styrene butadiene-based rubber, and polyimide. These binders may be used alone, or two or more thereof may be used in a combination.

Among the binders described above, due to excellent binding properties, polyvinylidene fluoride or styrene butadiene-based rubber is preferable.

The usage form of the binder of the present embodiment is not particularly limited. However, due to environmental friendliness and excellent binding properties, it is preferable to use a so-called water-based binder which is used in a latex state where the binder is dispersed or dissolved in an aqueous medium.

From the viewpoint of ensuring fluidity suitable for coating, the electrode slurry of the present embodiment may further a thickener. The thickener of the present embodiment is not particularly limited as long as the thickener is an ordinary thickener which can be used for a lithium-ion secondary battery. However, Examples of the thickener include cellulose-based polymers such as carboxymethylcellulose, methylcellulose, and hydroxypropylcellulose; and soluble polymers such as ammonium salts thereof, alkali metal salt, polycarboxylic acid, polyethylene oxide, polyvinyl pyrrolidone, polyacrylic acid salt, and polyvinyl alcohol. These thickeners may be used alone, or two or more thereof may be used in a combination.

The electrode slurry of the present embodiment may further include a conductive assistant. The conductive assistant of the present embodiment is not particularly limited as long as the conductive assistant is an ordinary conductive assistant which can be used for a lithium-ion secondary battery. However, Examples of include carbon materials such as acetylene black, Ketjenblack, carbon black, and vapor-grown carbon fibers.

Subsequently, a current collector is coated with the obtained electrode slurry and is dried.

A generally known method can be used as a method of coating a current collector with electrode slurry. Examples of the coating method can include a reverse roll method, a direct roll method, a doctor blade method, a knife method, an extrusion method, a curtain method, a gravure method, a bar method, a dipping method, and a squeezing method.

Only one surface of the current collector may be coated with the electrode slurry, or both surfaces may be coated. In a case where both surfaces of the current collector are coated, the current collector may be coated successively one surface at a time or both surfaces may be coated at the same time. In addition, the surface of the current collector may be coated continuously or intermittently. The thickness, the length, and the width of a coating layer can be suitably determined in accordance with the size of a battery.

A generally known method can be used as a method of drying coated electrode slurry. Particularly, it is preferable that hot air, vacuum, infrared rays, far infrared rays, electron beams, and warm air are used alone or in a combination. An ordinary drying temperature ranges from equal to or higher than 30° C. to equal to or lower than 350° C.

The current collector used for manufacturing the electrode of the present embodiment is not particularly limited as long as the current collector is an ordinary current collector which can be used for a lithium-ion secondary battery. However, from the viewpoint of price, availability, electrochemical stability, and the like, it is preferable to use aluminum for a positive electrode and copper for a negative electrode. In addition, the shape of the current collector is not particularly limited either. However, for example, it is possible to use a foil current collector having a thickness ranging from 0.001 mm to 0.5 mm.

The electrode for a lithium-ion secondary battery of the present embodiment may be subjected to pressing as necessary. A generally known method can be used as a pressing method. Examples of the pressing method include a die-pressing method and a calendar pressing method. The pressure of pressing is not particularly limited. For example, the pressure ranges from 0.2 t/cm$^2$ to 3 t/cm$^2$.

Compounding of the electrode for a lithium-ion secondary battery the present embodiment is not particularly limited for being suitably determined in accordance with the purpose of use or the like of a battery. The compounding thereof can be set based on generally known information.

The thickness and the density of layers of the positive electrode active material and the negative electrode active material of the present embodiment is not particularly limited for being suitably determined in accordance with the purpose of use or the like of a battery. The thickness and the density thereof can be set based on generally known information.

A sheet-shaped electrode 110 can be obtained by the method described above.

[(2) Step of Measuring Quantity of Moisture in Electrode]

In the step of measuring the quantity of moisture in the electrode 110, the quantity of moisture in the electrode 110 is measured by using the method of measuring a quantity of moisture in an electrode of the present embodiment described above. The detailed description of this step will not be repeated herein.

[(3) Sorting Step of Sorting Out Electrode]

In the method of manufacturing an electrode for a lithium-ion secondary battery of the present embodiment, it is preferable to further perform the sorting step of sorting out an electrode 110 appraised to be acceptable by appraising the quality of the electrode 110 based on obtained information on the quantity of moisture in the electrode 110.

The sorting step of the present embodiment is not particularly limited. For example, the quality of the electrode 110 is appraised by comparing the obtained information on the quantity of moisture in the electrode 110 with reference data indicating a relationship between the quantity of moisture in an electrode and electrode characteristics prepared in advance.

Here, since the permissible amount of the quantity of moisture in an electrode varies in accordance with the specification of the electrode, such as the type of each component constituting the electrode, the compounding ratio, and the thickness of the electrode, it is preferable that the reference data to be used is suitably prepared in accordance with the specification of the electrode. The method of preparing reference data is not particularly limited. For example, electrodes varying in moisture quantity are produced and characteristics of each electrode are measured for a specification of a certain electrode, so that reference data can be prepared as a specification of the electrode. The electrode characteristics are not particularly limited. Examples of the electrode characteristics include ordinary evaluation of an electrode carried out in the field of lithium-ion secondary batteries, such as peel strength of the electrode, volume resistivity, and charging and discharging characteristics of a battery using the electrode.

The sorting step of the present embodiment is not particularly limited. An electrode having the amount of chemical adsorption water in the electrode 110 preferably equal to or less than 400 ppm by mass or more preferably equal to or less than 300 ppm by mass may be appraised to be acceptable.

When the amount of chemical adsorption water in the electrode 110 is equal to or less than the upper limit described above, irreversible reaction between moisture inside a battery and each of members configuring the lithium-ion secondary battery can be suppressed, so that charging and discharging characteristics of an obtained lithium-ion secondary battery becomes further favorable.

Here, for example, the chemical adsorption water can be measured by the method described below.

First, the heating temperature of inert gas heated by the first heating unit 107a is set to range from equal to or higher than 150° C. to equal to or lower than 220° C., such that physical adsorption water adsorbed to the electrode 110 escapes. Subsequently, a heating unit is switched to the second heating unit 107b, so that the heating temperature of inert gas heated by the second heating unit 107b is set to range from equal to or higher than 250° C. to equal to or lower than 350° C., and then the amount of the chemical adsorption water adsorbed to the electrode 110 can be measured.

In addition, for example, the chemical adsorption water can also be measured by the method described below.

First, two same-type electrodes 110 which are measurement target samples are prepared. Subsequently, one electrode 110 is selected, and the heating temperature of inert gas heated by the first heating unit 107a is set to range from equal to or higher than 150° C. to equal to or lower than 220° C., such that the physical adsorption water adsorbed to the electrode 110 escapes. Then, the amount of the physical adsorption water is measured.

Subsequently, the other electrode 110 is selected, and the heating unit is switched to the second heating unit 107b. The heating temperature of inert gas heated by the second heating unit 107b is set to range from equal to or higher than 250° C. to equal to or lower than 350° C., and the total amount of the physical adsorption water and the chemical adsorption water adsorbed to the electrode 110 is measured.

Subsequently, the amount of the physical adsorption water is subtracted from the total amount of the physical adsorption water and the chemical adsorption water, and then the amount of the chemical adsorption water adsorbed to the electrode 110 can be obtained.

The first aspect of the invention is not limited to the embodiment described above. Changes, improvements, and the like are included in the first aspect of the invention within the scope in which the objects of the first aspect of the invention can be achieved.

[Second Aspect of Invention]

Hereinafter, an embodiment according to a second aspect of the invention will be described.

<Moisture Quantity Measuring Apparatus>

First, a moisture quantity measuring apparatus 100 of the present embodiment will be described.

FIGS. 1 to 3 are cross-sectional views illustrating examples of a configuration of a moisture quantity measuring apparatus 100 according to the embodiment of the present invention.

The moisture quantity measuring apparatus 100 includes the container 105 that has the gas introduction pipe 101 and the gas discharge pipe 103 and accommodates a measurement target sample 110, the heating unit 107 that heats the measurement target sample 110 by supplying inert gas heated to a predetermined temperature in advance to the inside of the container 105 through the gas introduction pipe 101 and vaporizes moisture adsorbed to the measurement target sample 110, and the moisture quantity measuring unit 109 that collects the moisture vaporized from the measurement target sample 110 through the gas discharge pipe 103 and determines the quantity of the collected moisture.

In addition, as necessary, a heating unit 120 which directly heats the container 105 can be provided on the periphery of the container 105.

It is desirably that the moisture quantity measuring apparatus 100 is installed in a dry room having a dew point equal to or lower than −30° C. at which the apparatus is less likely to be affected by moisture.

The material of the container 105 is not particularly limited. However, for example, the container 105 is formed of heat resistant materials including heat resistant glass such as borosilicate glass and quartz glass; and stainless steel. As a cap of the container 105, it is preferable to use a cap produced by using a material which is soft and excellent in heat resistance, such as polytetrafluoroethylene (PTFE).

In addition, the shape and the size of the container 105 are not particularly limited. The shape and the size thereof are suitably determined depending on the size or the throughput of the measurement target sample 110 to be subjected to measurement of the moisture quantity.

In addition, FIGS. 1 to 3 illustrate examples in which the gas introduction pipe 101 and the gas discharge pipe 103 are connected to an upper portion of the container 105. However, the connection portions are not particularly limited and may be a side portion and an upper portion of the container 105.

The measurement target sample 110 is not particularly limited. For example, the effect of the present embodiment can be preferably achieved more effectively in a case of a member having a shape in which heat is unlikely to be transferred sufficiently by only the heat conduction through contact on the inner side of the container 105, such as a sheet-shaped member, a block-shaped member, a member having a surface on which irregularity is formed. Since such a member has a small contact surface area with respect to the container 105, heat from the container 105 is unlikely to be transferred.

Particularly, in the positive electrode or the negative electrode for a lithium-ion secondary battery, since the member itself is a sheet-shaped member having low heat conductivity, the effect of the present embodiment can be achieved more effectively.

The inert gas is supplied from a container (not illustrated in the drawings) filled with the inert gas to the inside of the container 105 through the gas introduction pipe 101. A flowmeter may be attached to the gas introduction pipe 101. The gas flow rate may be controlled with the flowmeter. In addition, the gas introduction pipe 101 may be provided with a valve 115 such that the gas supply can switch between ON and OFF.

Here, the inert gas is heated to a predetermined temperature by the heating unit 107 installed between the container filled with the inert gas and the container 105.

The heating unit 107 is not particularly limited. However, for example, a known heating device using a heat source, such as a heater and a halogen lamp can be used. Any heating device may be employed as long as the inert gas can be heated.

The inert gas is not particularly limited as along as the gas is inactive with respect to the measurement target sample 110 in a high-temperature state. However, for example, one or more selected from nitrogen gas, helium gas, and argon gas can be used. Among these, from the viewpoint of low price, nitrogen gas is particularly preferable. From the viewpoint of more precisely measuring the quantity of moisture in the measurement target sample 110, it is preferable that the inert gas is sufficiently dehydrated using silica gel, molecular sieve, Sicapent, or the like before use.

Here, methods in the related art disclosed in Patent Document 1 (Japanese Unexamined Patent Publication No. H7-43371), Patent Document 2 (Japanese Unexamined Patent Publication No. H7-43268), and the like require a long period of time. However, for example, it has been possible to accurately measure the quantity of moisture in a member to which only physical adsorption water is adsorbed, such as a separator, a tub, and an exterior material which are constituent members of a lithium-ion secondary battery. However, upon investigation of the inventors, it has become clear that in the methods in the related art, it is difficult to individually and accurately measure moisture in adsorption forms different from each other with respect to a member to which not only physical adsorption water but also chemical adsorption water is adsorbed, that is, a member to which two or more kinds of moisture in adsorption forms different from each other are adsorbed, in a short period of time as in an electrode for a lithium-ion secondary battery.

It is assumed that although vial bottle-type apparatuses in the related art have sufficient measurement accuracy of the moisture quantity, since accuracy of a measurement temperature is poor, it is difficult to clearly isolate the chemical adsorption water and the physical adsorption water from each other. For example, in a case where the quantity of moisture in an electrode of a lithium-ion secondary battery is measured using a vial bottle-type apparatus, a method as described below is employed. The electrode is cut into a certain size, and the mass is precisely measured using an electronic balance. Then, the electrode is finely cut and is inserted into a vial bottle. Thereafter, the vial bottle is covered with a lid and is set to the apparatus. Predetermined conditions are set, the moisture quantity is measured, and the moisture percentage is thereby obtained from the mass measured in advance.

In this case, if there is only moisture such as physical adsorption water attached to the outermost surface of a member (measurement sample), all moisture escapes by setting the temperature to be higher than the boiling point of water, so that the moisture quantity can be precisely measured. However, in a case where chemical adsorption water is also adsorbed in addition to physical adsorption water, it is difficult to precisely measure each of the moisture quantities by only setting the temperature to be higher than the boiling point of water.

Since the influences of the physical adsorption water and the chemical adsorption water are different from each other inside a battery, the physical adsorption water and the chemical adsorption water are required to be precisely isolated and measured. In a case of a vial bottle-type apparatus, a unit which heats the entire vial bottle by means of a heater is often employed. In this case, although the vial bottle itself reaches a predetermined temperature, the measurement sample is not always at the temperature. If the measurement sample is in a form of powder or has high heat conductivity, there are cases where the measurement sample is sufficiently heated by only the heat conduction through contact on the inner side of the vial bottle and reaches a predetermined temperature. However, since a sheet-shaped member such as an electrode of a lithium-ion secondary battery has poor heat conductivity, heat is not sufficiently transferred by only the heat conduction from the vial bottle.

Meanwhile, in a Karl Fischer moisture meter, moisture vaporized from a measurement sample is introduced into an electrolytic solution for Karl Fischer reaction. Therefore, the vial bottle is required to be purged with inert gas. In such a device, there are many cases where nitrogen gas dried by means of a strong drying material (silica gel, molecular sieve, Sicapent, or the like) is introduced. In such a device, since nitrogen gas is at the ambient temperature (room temperature), the nitrogen gas is directly sprayed to the sample so as to cool the sample. As a result, the rate of temperature rise of the measurement sample drops, or the temperature does not reach a predetermined temperature, thereby being saturated at a temperature which is lower than the set temperature by several tens of degrees (where heating by the heater and cooling by the nitrogen gas are balanced), resulting in difficulties measuring the moisture quantity at the desired temperature which has been set.

The inventor has intensively and repetitively investigated in order to achieve the objects described above. As a result, it has been found that moisture in adsorption forms different from each other can be measured individually and accurately in a short period of time by utilizing inert gas having heating temperatures different from each other.

That is, in a case where the measurement target sample 110 includes two or more kinds of moisture in adsorption forms different from each other, moisture in adsorption forms different from each other can be measured individually and accurately in a short period of time by utilizing inert gas having heating temperatures different from each other.

For example, in a case where the measurement target sample 110 includes the primary region water and the secondary region water having adsorption forms different from each other, as illustrated in FIG. 2, the heating unit 107 can be configured to include the first heating unit 107a that heats the measurement target sample 110 by supplying the first inert gas heated to a predetermined temperature in advance to the inside of the container 105 through the gas introduction pipe 101 and vaporizes the primary region water adsorbed to the measurement target sample 110, and the second heating unit 107b that further heats the measurement target sample 110 by supplying the second inert gas heated to a temperature higher than the temperature of the first inert gas to the inside of the container 105 through the gas introduction pipe 101 and vaporizes the secondary region water adsorbed to the measurement target sample 110. In this manner, moisture in adsorption forms different from each other can be measured individually and accurately in a short period of time.

Here, examples of the primary region water can include physical adsorption water. In addition, examples of the secondary region water can include chemical adsorption water.

From the viewpoint of simplifying the apparatus, it is preferable that the second heating unit 107b is configured to be the same as the first heating unit 107a except for being used at a temperature higher than that of the first heating unit 107a.

For example, as the first inert gas and the second inert gas, one or more selected from nitrogen gas, helium gas, and argon gas can be used. Among these, from the viewpoint of low price, nitrogen gas is particularly preferable. From the viewpoint of more precisely measuring the quantity of moisture in the measurement target sample 110, it is preferable that the first inert gas and the second inert gas are sufficiently dehydrated using silica gel, molecular sieve, Sicapent, or the like before use.

The gas discharge pipe 103 is connected to the moisture quantity measuring unit 109. Accordingly, moisture vaporized from the measurement target sample 110 is collected from the container 105 together with the inert gas through the gas discharge pipe 103, and moisture which is a measurement subject can be introduced to the moisture quantity measuring unit 109.

The moisture quantity measuring unit 109 is not particularly limited. For example, it is possible to use a moisture meter employing a known method such as the Karl Fischer's moisture quantity determination method, the loss-on-drying method, the infrared absorbing method, and the gas chromatography method. Among these, from the viewpoint of being accurate and being capable of measuring in a short period of time, as the moisture quantity measuring unit 109, the Karl Fischer moisture meter is preferable.

Here, it is preferable to have a configuration in which the inert gas can be heated, in order to prevent inert gas including moisture vaporized from the electrode 110 from being cooled and adhering to an inner side of piping of the gas discharge pipe 103.

In addition, there is a possibility that high-temperature gas will enter the Karl Fischer moisture meter and a Karl Fischer reagent is at a high temperature and deteriorates. Therefore, in the present embodiment, it is preferable that the gas discharge pipe 103 is provided with a thermoelectric couple, the gas is cooled by a gas temperature adjusting function (not illustrated in the drawings) provided in the gas discharge pipe 103 such that the gas temperature does not become excessively high, and then the inert gas including vaporized moisture is introduced the Karl Fischer moisture meter.

However, when the temperature of the inert gas including vaporized moisture drops excessively, moisture adheres to the gas discharge pipe 103 and causes an error. Therefore, in order to prevent the inert gas from being excessively cooled, it is preferable that a fan (not illustrated in the drawings) is installed in the piping, and the temperature is controlled by monitoring the temperature with the thermoelectric couple.

<Method of Measuring Moisture Quantity>

Next, a method of measuring a moisture quantity of the present embodiment will be described.

The method of measuring a moisture quantity of the present embodiment is a method of measuring a quantity of moisture in a measurement target sample using the moisture quantity measuring apparatus 100 and includes at least three steps (A) to (C) as follows:

(A) a step of disposing a measurement target sample 110 inside the container 105 provided with the gas introduction pipe 101 and the gas discharge pipe 103;

(B) a step of causing the heating unit 107 to heat the measurement target sample 110 by supplying inert gas heated to a predetermined temperature in advance to the inside of the container 105 through the gas introduction pipe 101 and to vaporize moisture adsorbed to the measurement target sample 110; and (C) a step of collecting the moisture vaporized from the measurement target sample 110, together with the inert gas through the gas discharge pipe 103 and causing the moisture quantity measuring unit 109 to determine the quantity of the collected moisture.

According to the method of measuring a moisture quantity of the present embodiment, when at least the three steps (A) to (C) described above are included, the temperature of a measurement target sample can accurately reach a particular temperature in a short period of time, so that it is possible to obtain, with high accuracy, the moisture quantity of adsorption water escaping within a particular temperature range.

Hereinafter, each of the steps will be described.

[(A) Step of Disposing Measurement Target Sample]

First, the measurement target sample 110 is disposed inside the container 105 provided with the gas introduction pipe 101 and the gas discharge pipe 103. In this case, the number of measurement target samples 110 to be disposed is not particularly limited. One or more measurement target samples 110 may be disposed.

The configuration of disposing the measurement target sample 110 inside the container 105 is not particularly limited. However, in a case of a sheet-shaped measurement target sample 110, examples thereof include a configuration in which the measurement target sample 110 leans against the inner wall of the container 105. Accordingly, inert gas is easily supplied to both surfaces of the measurement target sample 110.

In addition, in a case where the measurement target sample 110 is an electrode for a lithium-ion secondary battery, for example, the electrode 110 can be cut into a quadrangular shape ranging from several square millimeters to several square centimeters, can be weighed precisely using an electronic balance (not illustrated in the drawings), and can be disposed inside the container 105.

[(B) Step of Vaporizing Moisture]

Next, the heating unit 107 heats the measurement target sample 110 by supplying inert gas heated to a predetermined temperature in advance to the inside of the container 105 through the gas introduction pipe 101 and vaporizes moisture adsorbed to the measurement target sample 110.

In a case where the measurement target sample 110 includes the primary region water and the secondary region water having adsorption forms different from each other, for example, the step of vaporizing moisture can include a step of heating the measurement target sample 110 by supplying first inert gas heated to a predetermined temperature in advance to the inside of the container 105 through the gas introduction pipe 101, and vaporizing primary region water adsorbed to the measurement target sample 110, and a step of further heating the measurement target sample 110 by supplying second inert gas heated to a temperature higher than the temperature of the first inert gas to the inside of the container 105 through the gas introduction pipe 101, and vaporizing secondary region water adsorbed to the measurement target sample 110 after the step of vaporizing primary region water, by using the device illustrated in FIG. 2. In this manner, moisture in adsorption forms different from each other can be measured individually and accurately in a short period of time.

Here, examples of the primary region water can include physical adsorption water. In addition, examples of the secondary region water can include chemical adsorption water.

In the step of vaporizing primary region water, for example, from the viewpoint of more accurately vaporizing only the physical adsorption water, it is more preferable that heating is performed to a range from equal to or higher than 150° C. to equal to or lower than 220° C.

In the step of vaporizing secondary region water, from the viewpoint of more accurately vaporizing only the chemical adsorption water, it is more preferable that heating is performed to a range from equal to or higher than 250° C. to equal to or lower than 350° C.

In addition, in the step of vaporizing moisture, it is preferable that ($T_2$–$T_1$) ranges from equal to or higher than 0° C. to equal to or lower than 50° C. when the temperature of directly heating the container 105 is $T_1$ [° C.] and the temperature of the inert gas is $T_2$ [° C.]. Accordingly, the temperature of the measurement target sample 110 can be raised to a target temperature in a shorter period of time, and moisture in the measurement target sample 110 having adsorption forms different from each other can be measured individually and accurately in a short period of time.

Here, for example, the heating unit 120 can be used for heating the container 105. The heating unit 120 is not particularly limited. However, for example, a known heating device using a heat source, such as a heater and a halogen lamp can be used. Any heating device may be employed as long as the container 105 can be heated.

[(C) Step of Determining Quantity of Moisture]

Next, moisture vaporized from the measurement target sample 110 is collected together with the inert gas through the gas discharge pipe 103, and the quantity of the collected moisture is determined by the moisture quantity measuring unit 109.

In a case where the measurement target sample 110 includes the primary region water and the secondary region water escaping within temperature ranges different from each other, for example, the step of determining the quantity of moisture can include the step of determining the quantity of the primary region water and the step of determining the quantity of the secondary region water. In this manner, the quantity can be determined by dividing the measurement subject into the primary region water and the secondary region water.

Next, a procedure of measuring the moisture quantity using the method of measuring a moisture quantity of the present embodiment will be described in detail with reference to FIGS. 2 and 3. In the following Examples, an electrode for a lithium-ion secondary battery is used as the measurement target sample.

Example 1

Hereinafter, the procedure will be described with reference to FIG. 2. First, a measurement target sample 110 is prepared. An electrode of a lithium-ion secondary battery is cut into a designated size and is weighed.

For example, it is favorable that the size of the electrode ranges approximately from 0.3 g to 2.0 g. The reason is that a small quantity causes an error and a large quantity hinders purge gas from sufficiently spreading and results in an extended measurement time. The electrode is cut into a quadrangular shape ranging from several square millimeters to several square centimeters so as to be an electrode which is the measurement target sample 110, and is inserted into the container 105. Thereafter, the container 105 is covered with the cap.

The container 105 is prepared in advance as many as the number of samples to be measured at the same time, and the container 105 for purge having no electrode is also prepared. Next, the first heating unit 107a and the second heating unit 107b are set.

For example, the first heating unit 107a measuring the primary region water (physical adsorption water) is set to range from 150° C. to 220° C. For example, the second heating unit 107b measuring the secondary region water (chemical adsorption water) is set to range from 250° C. to 350° C. For example, the heating unit 120 is set to the same temperature as that of the first heating unit 107a.

Next, the inert gas flow rate, the measurement time, and the like are set in accordance with the properties of the electrode. It is favorable that the inert gas flow rate ranges approximately from 200 cc/min to 500 cc/min. The measurement time ends when the currently measuring moisture quantity becomes substantially 0 μg/sec.

The measurement method is performed under the following procedure.

First, the container 105 having no electrode is prepared and the container 105 is set inside the heating unit 120. Subsequently, the first inert gas heated by the first heating unit 107a is caused to flow into the container 105 through the gas introduction pipe 101. The gas is caused to flow into the moisture quantity measuring unit 109 as well, and moisture remaining inside the inner side of piping or the moisture quantity measuring unit 109 is eliminated while background titration is performed.

Next, the container 105 accommodating an electrode which is the measurement target sample 110 is set to the heating unit 120. Subsequently, the first inert gas heated by the first heating unit 107a is caused to flow into the container 105 through the gas introduction pipe 101. The gas which has flowed is introduced to the moisture quantity measuring unit 109 together with moisture vaporized from the electrode through the gas discharge pipe 103. The moisture quantity measuring unit 109 measures the amount of the primary region water (physical adsorption water) vaporized from the electrode.

Next, the inert gas line is switched to the second heating unit 107b side by using the valve 115. In the same manner, the second inert gas heated by the second heating unit 107b is caused to flow into the container 105 through the gas introduction pipe 101. The gas which has flowed is introduced to the moisture quantity measuring unit 109 together with moisture vaporized from the electrode through the gas discharge pipe 103. The moisture quantity measuring unit 109 measures the amount of the secondary region water (chemical adsorption water) vaporized from the electrode.

The result is recorded in a control unit (not illustrated in the drawings) or is printed out such that data is retained. Thereafter, the gas line is disconnected, and the container 105 is taken out from the heating unit 120. Subsequently, a next measurement sample is measured under the same procedure. The series of operations can also be conducted such that samples are automatically replaced through automatic sample replacement.

In Example 1, the first heating unit 107a and the second heating unit 107b are provided as heating units. However, three or more heating units may be provided for a subdivided analysis.

Example 2

Hereinafter, the procedure will be described with reference to FIG. 3. In this Example, the form of the configuration described using FIG. 2 is partially changed. Parts different from Example 1 will be mainly described, and the description of parts in common with Example 1 will not be repeated herein. In this Example, the heating unit 120 is used as a heating unit measuring the primary region water (physical adsorption water), and the heating unit 107 is used as a heating unit measuring the secondary region water (chemical adsorption water).

Although this Example requires a measurement time longer than that in Example 1 but has a merit in that the configuration can be simplified.

The measurement method is performed under the following procedure.

The procedure from the preparation of a sample to the operation of eliminating moisture remaining on the inner side of piping or inside the moisture quantity measuring unit 109 is the same as that in Example 1. However, for example, the heating unit 120 measuring the primary region water (physical adsorption water) is set to range from 150° C. to 220° C. For example, the heating unit 107 measuring the secondary region water (chemical adsorption water) is set to range from 250° C. to 350° C.

Next, the container 105 accommodating an electrode which is the measurement target sample 110 is set to the heating unit 120. Subsequently, the inert gas, which is not heated, is caused to flow into the container 105 through the gas introduction pipe 101. The gas which has flowed is introduced to the moisture quantity measuring unit 109 together with moisture vaporized from the electrode through the gas discharge pipe 103. The moisture quantity measuring unit 109 measures the amount of the primary region water (physical adsorption water) vaporized from the electrode 110.

Next, the inert gas line is switched to the heating unit 107 side by using the valve 115. Subsequently, the inert gas heated by the heating unit 107 is caused to flow into the container 105 through the gas introduction pipe 101. The gas which has flowed is introduced to the moisture quantity measuring unit 109 together with moisture vaporized from the electrode through the gas discharge pipe 103. The moisture quantity measuring unit 109 measures the amount of the secondary region water (chemical adsorption water) vaporized from the electrode.

The result is recorded in a control unit (not illustrated in the drawings) or is printed out such that data is retained. Thereafter, the gas line is disconnected, and the container 105 is taken out from the heating unit 120. Subsequently, a next measurement sample is measured under the same procedure. The series of operations can also be conducted such that samples are automatically replaced through automatic sample replacement.

According to the method of measuring a moisture quantity of the present embodiment, it is possible to realize stabilization and high reliability of the quality of the electrode for a lithium-ion secondary battery.

In the lithium-ion secondary battery, management of the quantity of moisture included in an electrode is particularly important. The moisture includes physical adsorption water which is only attached to the surface and chemical adsorption water which is adsorbed due to chemical reaction. Most of the physical adsorption water can be eliminated by drying for approximately several hours at a temperature equal to or higher than 150° C. in a vacuum or under the inert gas. Meanwhile, the chemical adsorption water is unlikely to be removed by heating and drying.

For example, such chemical adsorption water is included in a positive electrode active material. When the amount of the chemical adsorption water increases, gassiness, cycle deterioration, or retention deterioration occurs while a battery cell is in use. Therefore, the amount of chemical adsorption water is required to be strictly managed during a production step.

In the method of measuring a moisture quantity of the present embodiment, the temperature of an electrode can accurately reach a particular temperature in a short period of time, and it is possible to accurately obtain the moisture quantity of chemical adsorption water escaping within a particular temperature range, in a short period of time. Therefore, according to the method of measuring a moisture quantity of the present embodiment, it is possible to evaluate an electrode for a lithium-ion secondary battery, in which the amount of chemical adsorption water is equal to or less than a management standard value and which is excellent in quality, in a stable manner with high efficiency.

In addition, according to the method of measuring a moisture quantity of the present embodiment, it is possible to more accurately obtain the moisture quantity of chemical adsorption water escaping within a particular temperature range, in a shorter period of time by using the moisture quantity measuring apparatus 100 provided with the first heating unit 107a and the second heating unit 107b as illustrated in FIG. 2. For example, it is possible to efficiently measure only the chemical adsorption water by measuring the physical adsorption water using the first heating unit 107a and switching the inert gas to the second heating unit 107b on the high-temperature side without any change.

The evaluation of an electrode using the method of measuring a moisture quantity of the present embodiment is not particularly limited. An electrode having the amount of chemical adsorption water in the electrode 110 which is preferably equal to or less than 400 ppm by mass or more preferably equal to or less than 300 ppm by mass can be appraised to be acceptable.

When the amount of chemical adsorption water in the electrode is equal to or less than the upper limit described above, irreversible reaction between moisture inside a battery and each of members configuring the lithium-ion secondary battery can be suppressed, so that charging and discharging characteristics of an obtained lithium-ion secondary battery becomes further favorable.

In the present embodiment, for example, chemical adsorption water can be measured by the method described below.

First, the heating temperature of inert gas heated by the first heating unit 107a is set to range from equal to or higher than 150° C. to equal to or lower than 220° C., such that physical adsorption water adsorbed to the measurement target sample 110 escapes. Subsequently, a heating unit is switched to the second heating unit 107b, so that the heating temperature of inert gas heated by the second heating unit 107b is set to range from equal to or higher than 250° C. to equal to or lower than 350° C., and then the amount of the chemical adsorption water adsorbed to the measurement target sample 110 can be measured.

In addition, for example, the chemical adsorption water can also be measured by the method described below.

First, two same-type measurement target samples 110 are prepared. Subsequently, one measurement target sample 110 is selected, and the heating temperature of inert gas heated by the first heating unit 107a is set to range from equal to or higher than 150° C. to equal to or lower than 220° C., such that the physical adsorption water adsorbed to the measurement target sample 110 escapes. Then, the amount of the physical adsorption water is measured.

Subsequently, the other measurement target sample 110 is selected, and the heating unit is switched to the second heating unit 107b. The heating temperature of inert gas heated by the second heating unit 107b is set to range from equal to or higher than 250° C. to equal to or lower than 350° C., and the total amount of the physical adsorption water and the chemical adsorption water adsorbed to the measurement target sample 110 is measured.

Subsequently, the amount of the physical adsorption water is subtracted from the total amount of the physical adsorption water and the chemical adsorption water, and then the amount of the chemical adsorption water adsorbed to the measurement target sample 110 can be obtained.

The second aspect of the invention is not limited to the embodiment described above. Changes, improvements, and the like are included in the second aspect of the invention within the scope in which the objects of the second aspect of the invention can be achieved.

Hereinabove, the embodiments of the present invention have been described. However, the embodiments are examples of the present invention, and various configurations can be employed in addition to those described above.

In addition, the present invention is not limited to the embodiments, and changes, improvements, and the like are included in the present invention within the scope in which the objects of the present invention can be achieved.

Naturally, the aspects of the present invention described above can be combined together within the scope not conflicting each other.

Exemplary Embodiment

Hereinafter, the present invention will be described through Exemplary Embodiment. However, the present invention is not limited thereto.

Exemplary Embodiment

1. Producing Positive Electrode

As a positive electrode active material, $LiNi_{0.8}Co_{0.15}Al_{0.05}O_2$ including a large amount of Ni was used.

A positive electrode was produced as follows. First, a positive electrode active material, carbon black, and a polyvinylidene fluoride binder dissolved and were mixed in N-methyl pyrrolidone (NMP), and electrode slurry was prepared.

Subsequently, one surface of aluminum foil (current collector) was coated with the electrode slurry such that the weight of the coated film after drying became 15 mg/cm$^2$, and was dried. Subsequently, an obtained electrode was subjected to compression forming through roll pressing so as to have density of 3.3 g/cm$^3$, and a positive electrode 1 was obtained.

Here, positive electrodes 2 to 10 having moisture quantities different from each other were produced under procedures similar to that of the positive electrode 1 except that the production lot and the storage period (under an environment at the temperature of 25° C. and the humidity equal to or lower than 40%) were varied.

2. Measuring Moisture Quantity

The amounts of physical adsorption water and chemical adsorption water in the obtained positive electrodes 1 to 10 were measured by employing the method using the device of the above-described present embodiment illustrated in FIG. 2 (Example 1). Here, the moisture quantities were measured while the temperature of a first heating unit 107a heating first inert gas was set to 160° C., the temperature of a second heating unit 107b heating second inert gas was set to 280° C., the flow rate of the inert gas was set to 200 cc/min, and the type of the inert gas was set to nitrogen gas.

3. Evaluating Characteristics of Battery

Next, a laminated lithium-ion secondary battery having cell capacity of 4 Ah was produced using the positive electrodes 1 to 10 as positive electrodes, a natural graphite-based material as a negative electrode, and ethylene carbonate (EC):ethyl methyl carbonate (EMC):diethyl carbonate (DEC):=1:1:1 (volume %) including $LiPF_6$ of 0.8 M as an electrolytic solution. After the lithium-ion secondary battery was subjected to aging, a cycle test (25° C., 600 cycles) was carried out, and a relationship between the amount of the chemical adsorption water and the gas generation amount, and the cycle characteristics was investigated. Table 1 shows the result.

The cycle maintenance factor was obtained by the following Expression.

Cycle maintenance factor [%]=100×(discharge capacity after 600 cycles)/(initial discharge capacity)

TABLE 1

| Type of positive electrode | Quantity of moisture escaped at 160° C. [ppm] | Quantity of moisture escaped at 320° C. [ppm] | Amount of chemical adsorption water [ppm] | Gas generation amount [cc] | Cycle maintenance factor [%] |
|---|---|---|---|---|---|
| Positive electrode 1 | 210 | 560 | 350 | 0.3 | 90 |
| Positive electrode 2 | 170 | 620 | 450 | 0.9 | 86 |
| Positive electrode 3 | 150 | 420 | 270 | 0.1 | 92 |
| Positive electrode 4 | 280 | 650 | 370 | 0.3 | 89 |
| Positive electrode 5 | 310 | 820 | 510 | 1.1 | 85 |
| Positive electrode 6 | 120 | 490 | 370 | 0.3 | 91 |
| Positive electrode 7 | 150 | 640 | 490 | 1.2 | 84 |
| Positive electrode 8 | 210 | 490 | 280 | 0.1 | 92 |
| Positive electrode 9 | 220 | 580 | 360 | 0.2 | 90 |
| Positive electrode 10 | 120 | 710 | 590 | 1.3 | 85 |

From Table 1, it has been found that the gas generation amount can be suppressed and a lithium-ion secondary battery having excellent cycle characteristics can be obtained by setting the amount of the chemical adsorption water to be equal to or less than 400 ppm and preferably equal to or less than 300 ppm.

In the present Exemplary Embodiment, $LiNi_{0.8}Co_{0.15}Al_{0.05}O_2$ including a large amount of Ni is described. However, the inventors have checked that similar tendencies are also observed in an electrode and the like in which $LiNiCoMnO_2$ or $LiMn_2O_4$ having a small amount of the Ni content (Ni>0.3) is mixed.

Priority is claimed on Japanese Patent Application No. 2015-119205 and Japanese Patent Application No. 2015-119206, filed on Jun. 12, 2015, the entire contents of which are incorporated herein by reference.

The invention claimed is:

1. A method of measuring a quantity of moisture in an electrode comprising:
   a step of disposing an electrode, which is a measurement target sample, inside a container provided with a gas introduction pipe and a gas discharge pipe;
   a step of heating the electrode by supplying inert gas heated to a predetermined temperature in advance to the inside of the container through the gas introduction pipe, and vaporizing moisture adsorbed to the electrode; and a step of collecting the moisture vaporized from the electrode, together with the inert gas through the gas discharge pipe and determining the quantity of the collected moisture.

2. The method of measuring a quantity of moisture in an electrode according to claim 1, wherein the step of vaporizing moisture includes a step of heating the electrode by supplying first inert gas heated to a predetermined temperature in advance to the inside of the container through the gas introduction pipe, and vaporizing primary region water adsorbed to the electrode, and a step of further heating the electrode by supplying second inert gas heated to a temperature higher than the temperature of the first inert gas to the inside of the container through the gas introduction pipe, and vaporizing secondary region water adsorbed to the electrode after the step of vaporizing primary region water.

3. The method of measuring a quantity of moisture in an electrode according to claim 2, wherein the step of determining the quantity of moisture includes a step of determining the quantity of the primary region water and a step of determining the quantity of the secondary region water.

4. The method of measuring a quantity of moisture in an electrode according to claim 2, wherein in the step of vaporizing primary region water, the first inert gas is heated to a range from equal to or higher than 150° C. to equal to or lower than 220° C.

5. The method of measuring a quantity of moisture in an electrode according to claim 2, wherein in the step of vaporizing secondary region water, the second inert gas is heated to a range from equal to or higher than 250° C. to equal to or lower than 350° C.

6. The method of measuring a quantity of moisture in an electrode according to claim 1, wherein in the step of vaporizing moisture, $(T_2-T_1)$ ranges from equal to or higher than 0° C. to equal to or lower than 50° C. when the temperature of directly heating the container is $T_1$ [° C.] and the temperature of the inert gas is $T_2$ [° C.].

7. The method of measuring a quantity of moisture in an electrode according to claim 1, wherein in the step of determining the quantity of the collected moisture, the quantity of moisture is determined by a Karl Fischer's moisture quantity determination method.

8. The method of measuring a quantity of moisture in an electrode according to claim 1, wherein the inert gas includes one or more selected from nitrogen gas, helium gas, and argon gas.

9. A method of manufacturing an electrode for a lithium-ion secondary battery, comprising:

a step of producing an electrode including an electrode active material; and a step of measuring the quantity of moisture in the electrode by using the method of measuring a quantity of moisture in an electrode according to claim 1.

10. The method of manufacturing an electrode for a lithium-ion secondary battery according to claim 9, further comprising:

a sorting step of sorting out an electrode appraised to be acceptable by appraising the quality of the electrode based on obtained information on the quantity of moisture in the electrode.

11. The method of manufacturing an electrode for a lithium-ion secondary battery according to claim 10, wherein in the sorting step, the quality of the electrode is appraised by comparing the obtained information on the quantity of moisture in the electrode with reference data indicating a relationship between the quantity of moisture in an electrode and electrode characteristics prepared in advance.

12. A moisture quantity measuring apparatus comprising:

a container that has a gas introduction pipe and a gas discharge pipe and accommodates a measurement target sample;

a heating unit that heats the measurement target sample by supplying inert gas heated to a predetermined temperature in advance to the inside of the container through the gas introduction pipe and vaporizes moisture adsorbed to the measurement target sample; and a moisture quantity measuring unit that collects the moisture vaporized from the measurement target sample, through the gas discharge pipe and determines the quantity of the collected moisture.

13. The moisture quantity measuring apparatus according to claim 12, wherein the heating unit includes a first heating unit which heats the measurement target sample by supplying first inert gas heated to a predetermined temperature in advance to the inside of the container through the gas introduction pipe and vaporizes primary region water adsorbed to the measurement target sample, and a second heating unit which further heats the measurement target sample by supplying second inert gas heated to a temperature higher than the temperature of the first inert gas to the inside of the container through the gas introduction pipe and vaporizes secondary region water adsorbed to the measurement target sample.

14. The moisture quantity measuring apparatus according to claim 13, wherein the measurement target sample has a sheet-like shape.

15. A method of measuring a quantity of moisture in a measurement target sample using the moisture quantity measuring apparatus according to claim 13, the method comprising:

a step of disposing a measurement target sample inside a container;

a step of causing the heating unit to heat the measurement target sample by supplying inert gas heated to a predetermined temperature in advance to the inside of the container through the gas introduction pipe and to vaporize moisture adsorbed to the measurement target sample; and a step of collecting the moisture vaporized from the measurement target sample, together with the inert gas through the gas discharge pipe and causing the moisture quantity measuring unit to determine the quantity of the collected moisture.

16. The method of measuring a moisture quantity according to claim 15, wherein the step of vaporizing moisture includes a step of heating the measurement target sample by supplying first inert gas heated to a predetermined temperature in advance to the inside of the container through the gas introduction pipe, and vaporizing primary region water adsorbed to the measurement target sample, and a step of further heating the measurement target sample by supplying second inert gas heated to a temperature higher than the temperature of the first inert gas to the inside of the container through the gas introduction pipe, and vaporizing secondary region water adsorbed to the measurement target sample after the step of vaporizing primary region water.

17. The method of measuring a moisture quantity according to claim 16,
wherein the step of determining the quantity of moisture includes a step of determining the quantity of the primary region water and a step of determining the quantity of the secondary region water.

18. The method of measuring a moisture quantity according to claim 16,
wherein in the step of vaporizing primary region water, the first inert gas is heated to a range from equal to or higher than 150° C. to equal to or lower than 220° C.

19. The method of measuring a moisture quantity according to claim 16,
wherein in the step of vaporizing secondary region water, the second inert gas is heated to a range from equal to or higher than 250° C. to equal to or lower than 350° C.

20. The method of measuring a moisture quantity according to claim 15,
wherein in the step of vaporizing moisture, $(T_2-T_1)$ ranges from equal to or higher than 0° C. to equal to or lower than 50° C. when the temperature of directly heating the container is $T_1$ [° C.] and the temperature of the inert gas is $T_2$ [° C.].

* * * * *